G. F. BASTMAN.
SCOOTER CAR.
APPLICATION FILED AUG. 23, 1918.
1,289,361. Patented Dec. 31, 1918.
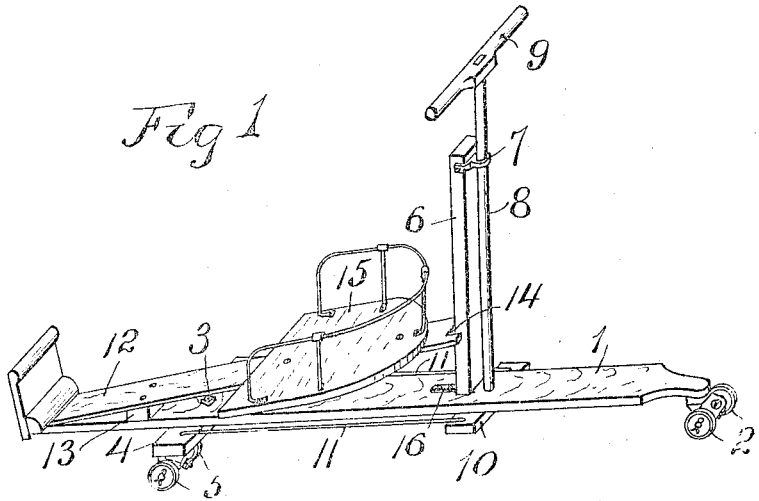
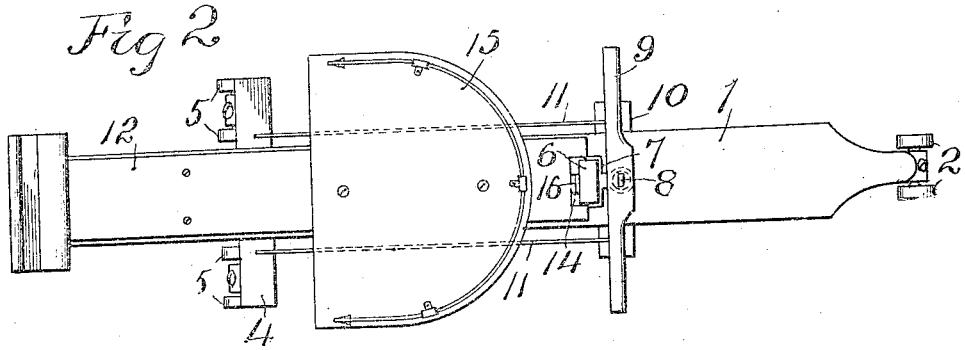
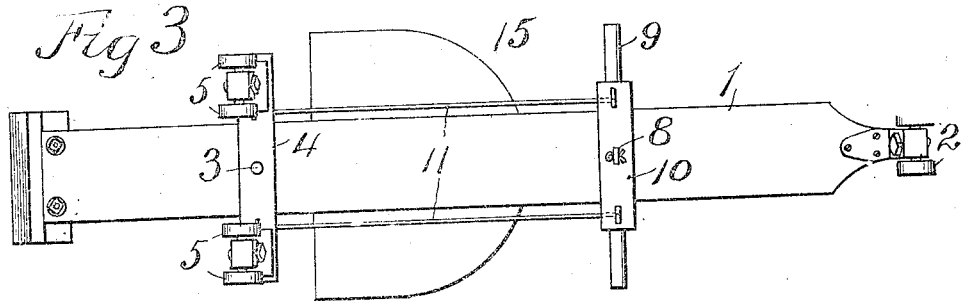
WITNESS:
INVENTOR.
George F. Bastman
BY Warren L. House
His ATTORNEY

UNITED STATES PATENT OFFICE.

GEORGE F. BASTMAN, OF KANSAS CITY, MISSOURI.

SCOOTER-CAR.

1,289,361.

Specification of Letters Patent.  Patented Dec. 31, 1918.

Application filed August 23, 1918.  Serial No. 251,173.

*To all whom it may concern:*

Be it known that I, GEORGE F. BASTMAN, a citizen of the United States, residing at Kansas City, in the county of Jackson and State of Missouri, have invented a certain new and useful Improvement in Scooter-Cars, of which the following is a specification.

My invention relates to improvements in scooter cars, of the type in which the operator rests his weight on one foot on the car and employs his other foot to strike the ground so as to propel the car.

One of the objects of my invention is to provide a scooter car adapted to carry a passenger without interference with the manipulation of the car by the operator.

Another object of my invention is to provide a scooter car with novel steering means.

My invention provides further novel means for supporting a seat on the car and which also serves as a bracing means for the standard which supports the steering wheel.

My invention provides still further novel means for supporting the seat.

My invention provides a structure which is strong, durable, not liable to get out of order, which is cheaply manufactured, and which is efficient for the purpose for which it is designed.

The novel features of my invention are hereinafter fully described and claimed.

In the accompanying drawing which illustrates the preferred embodiment of my invention, Figure 1 is a perspective view of my improved scooter car.

Fig. 2 is a top view of the same.

Fig. 3 is a bottom view of the same.

Similar reference characters designate similar parts in the different views.

1 designates a horizontal base member, preferably a flat board, and which has its rear end supported by a pair of wheels 2, such as are used on roller skates.

Pivoted to the base member 1 by a vertical king bolt 3 is an axle 4 opposite ends of which are, preferably, respectively supported by two pairs of wheels 5, which are similar to the wheels 2.

Secured at its lower end to the base member 1, forward of the rear end thereof, is a vertical standard 6, to the rear side of which is pivoted in a bearing 7, a vertical steering post 8, to the upper end of which is rigidly secured a cross bar handle 9. Rigidly secured to the lower end of the steering post 8, below the base member 1 in which the steering post is pivoted, is a cross bar, 10, which with two rods 11 connected thereto and to the axle 4 constitute steering transmission means between the steering post and the axle by which the axle is swung.

The rear ends of the rods 11 are preferably connected to the cross bar 10 at opposite sides of the steering post 8, and the forward ends of the rods 11 are respectively connected to the axle 4 at opposite sides respectively of the king bolt 3. By this manner of connecting the rods to the cross bar and axle, very light rods may be used, as one rod is pulling when the axle is swung in either direction.

A spring board 12 has its forward end rigidly secured to the base member 1 at the forward end of the latter and forward of a cross bar 13 which supports the spring board near the forward end thereof and in turn is supported by the base member 1.

The rear end of the spring board 12 is, preferably, provided with a notch 14 in which the standard is fitted. This construction affords a double function. It prevents the rear end of the spring board from liability to swing or to be moved laterally, and it also serves as bracing means for the standard to hold it from lateral tipping.

Mounted on the spring board intermediate of the standard 6 and the cross board or bar 13 is a seat 15 adapted to carry a passenger. The spring board provides a resilient support for the seat 15.

The steering post 8 and standard 6 are located at some distance forward of the rear end of the base member 1 so as to provide a space for receiving one foot of the operator, who while standing and having hold of the steering handle 9, uses his other foot for striking the ground to propel the car along, in the manner well known.

The steering post 8 being located at the rear of the seat 15, the passenger, who occupies the seat does not interfere at all with the operator in his manipulation of the car. If desired, the seat 15 can be used for carrying bundles, or other articles.

The operation of the car is simple and easily understood. The operator standing with one foot on the base member at the rear of the steering post 8 employs his other foot to propel the car by pushing rearwardly on the ground. If he desires to turn the car to the right he swings the handle 9 clockwise, as viewed in Fig. 2, thereby turning the axle 4 through the intermediacy of the cross bar 10 and rods 11. By swinging the handle 9 in the reverse direction the car will be turned to the left.

The rods 11 are pivoted in the cross bar 10 and axle 4. An angle iron 16 secured to the base member 1 is also secured to the standard 6 for the purpose of firmly bracing the latter.

I do not limit my invention to the structure shown and described, as modifications, within the scope of the appended claims, may be made without departing from the spirit of my invention.

What I claim is:—

1. In a scooter car, a base member, a spring board supported at one end thereon, a seat mounted on said spring board, steering means for the base member including a manually operated member forward of the rear end of the base member and at the rear of said seat.

2. In a scooter car, a base member, an axle pivoted thereto, a steering post pivoted to the base member forward of the rear end thereof, transmission means connecting the axle and steering post, a spring board secured at one end to the base member forward of the steering post, and a seat carried by the spring board.

3. In a scooter car, a base member, a standard secured thereto, an axle pivoted to the base member forward of the standard, a steering post pivoted to the standard, transmisson means connecting the axle and steering post, a spring board secured at its forward end to the base member and having its rear free end adapted to be guided by said standard, and a seat carried by the spring board.

4. In a scooter car, a base member, a spring board having one end secured thereto, a seat carried by the spring board, a standard secured to the base member and adapted to serve as a guide for the spring board, and means including a manually operated member pivoted to the standard for steering said base member.

5. In a scooter car, a base member, a spring board having one end secured to the base member, a seat carried by the spring board, a standard secured to the base member at the rear of the spring board and adapted to serve as a guide therefor, a steering post pivoted to the standard, an axle pivoted to the base member, and transmission means connecting the axle and steering post.

6. In a scooter car, a base member, a spring board secured at its forward end thereto and having in its rear end a notch, a seat carried by the spring board, a standard secured to the base member and fitted in said notch, a steering post pivoted in the base member and to said standard, a cross bar secured to said steering post, an axle pivoted to the base member, and two rods connected at one set of ends to the axle at opposite sides of the axis thereof, and connected at their other set of ends to the cross bar at opposite sides of the axis thereof.

In testimony whereof I have signed my name to this specification.

GEORGE F. BASTMAN.